July 12, 1932.  E. G. BRIDGES  1,867,440
METHOD OF AND APPARATUS FOR GATHERING MOLTEN GLASS IN MOLDS
Filed Dec. 26, 1929  3 Sheets-Sheet 1

Inventor
Edward G. Bridges.
By Emery, Booth, Varney & Holcomb
his Attorneys

July 12, 1932. E. G. BRIDGES 1,867,440
METHOD OF AND APPARATUS FOR GATHERING MOLTEN GLASS IN MOLDS
Filed Dec. 26, 1929 3 Sheets-Sheet 2
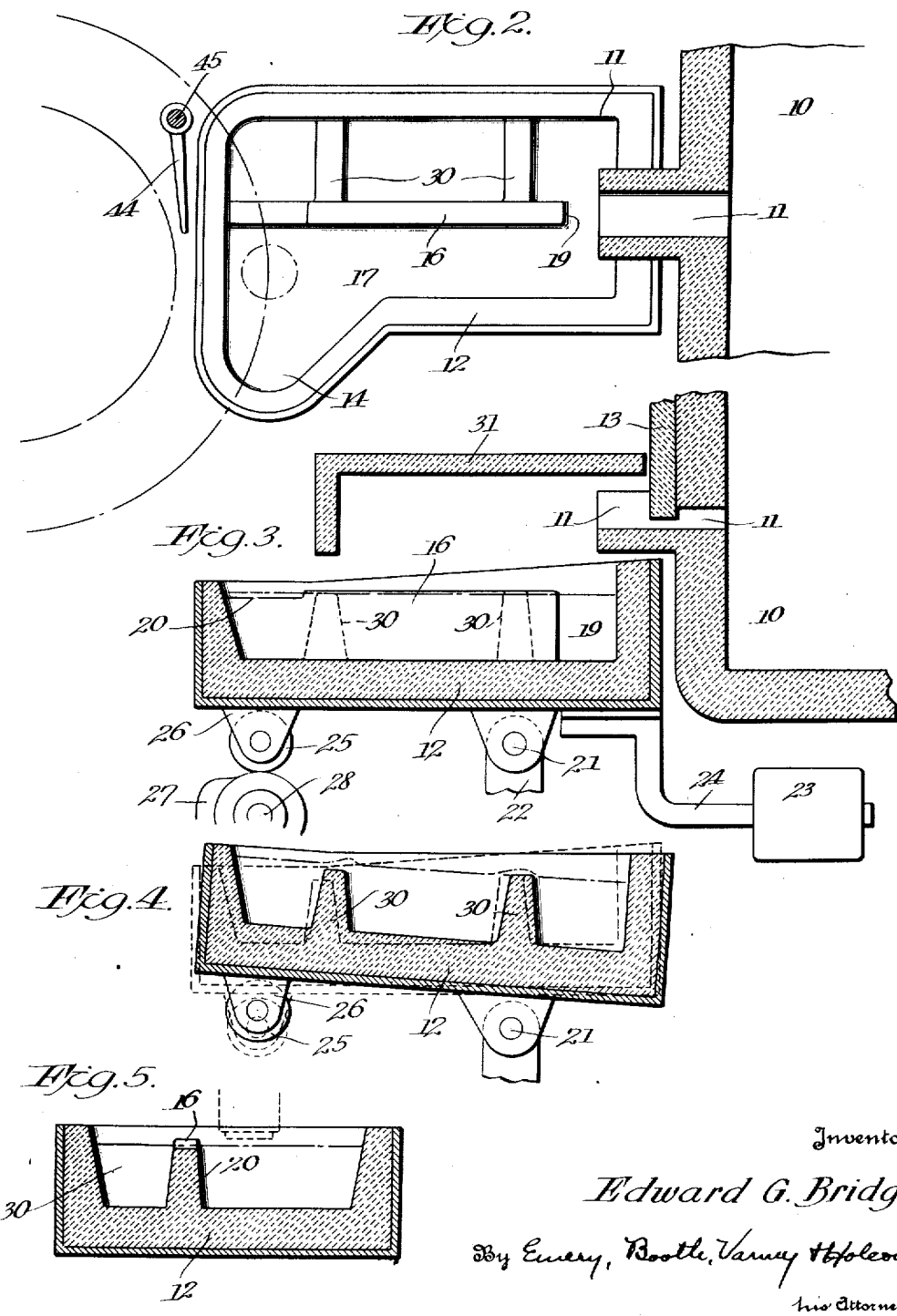
Inventor
Edward G. Bridges.

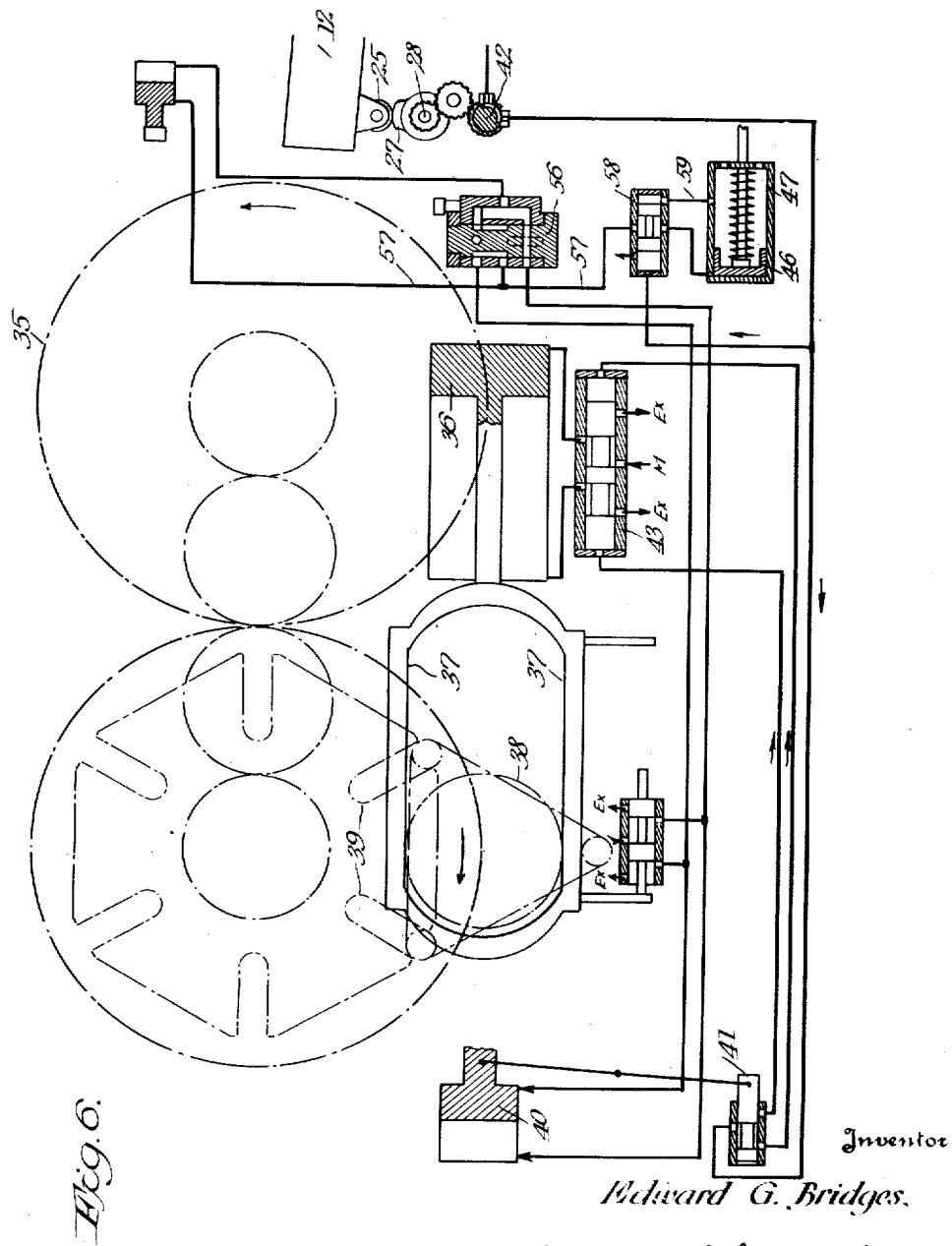

Patented July 12, 1932

1,867,440

UNITED STATES PATENT OFFICE

EDWARD G. BRIDGES, OF ANDERSON, INDIANA, ASSIGNOR TO LYNCH GLASS MACHINE COMPANY, A CORPORATION OF INDIANA

METHOD OF AND APPARATUS FOR GATHERING MOLTEN GLASS IN MOLDS

Application filed December 26, 1929. Serial No. 416,621.

The present invention relates to methods of and apparatus for automatically gathering molten glass in glassware shaping molds, and aims generally to improve the product by improvements in both the method and the apparatus so as to insure a better circulation of the glass in the receptacle from which it is periodically withdrawn, as well as to simplify the apparatus for gathering and shaping the ware.

The invention relates generally to forming glassware in machines of the so-called suction or vacuum type, that is, wherein the mold is filled with its charge of molten glass by being brought into contact at its open lower end with the surface of the glass in the supply tank or pot and applying suction in the mold to raise the charge of glass therein, and one of the objects of the invention is to improve the construction of the receptacle or pot from which the mold charges are periodically withdrawn to permit of moving it up and down for assisting in circulating the glass therein so that fresh charges of glass uncontaminated with chilled glass are always presented in the gathering chamber or area for successive gathers.

Furthermore, the invention aims to provide for supplying suitable glass to the gathering chamber or area of the pot under a variety of operating conditions so that the invention is useful in combination with forming machines embodying either the vertically movable type of dipping molds, or molds mounted to move in a definite path, either undulating or in a uniform horizontal plane.

Other aims and objects of the invention, and advantages thereof, appear in connection with the following description of one manner of practicing the method, and of one form of apparatus suitable therefor illustrated by reference to the accompanying drawings, wherein Fig. 1 is a vertical sectional view through the apparatus at the glass supply or charging position (the section through the pot being taken on the line 1—1 of Fig. 2 with the pot raised), showing the glass feeding devices associated with a portion of a glass forming machine;

Fig. 2 is a plan view of the glass-receiving pot and a portion of the supply tank therefor;

Fig. 3 is a sectional view taken on the line 3—3 of Fig. 2, showing the pot in its lowered or normal position when not feeding glass to the gathering apparatus;

Fig. 4 is a sectional view on the line 4—4 of Fig. 2 showing the pot raised and illustrating the behavior of the glass within the pot during rearward flow, i. e. toward the inner end, when the pot is raised as illustrated in Fig. 1; and showing in dotted lines the pot lowered in normal position for inducing forward flow;

Fig. 5 is a transverse sectional view through the gathering chamber or exposed portion of the pot taken on the line 5—5 of Fig. 2; and Fig. 6 is a diagram illustrating the timing and operating means for synchronizing the tilting pot with a fluid pressure driven glass forming machine.

Figure 1:
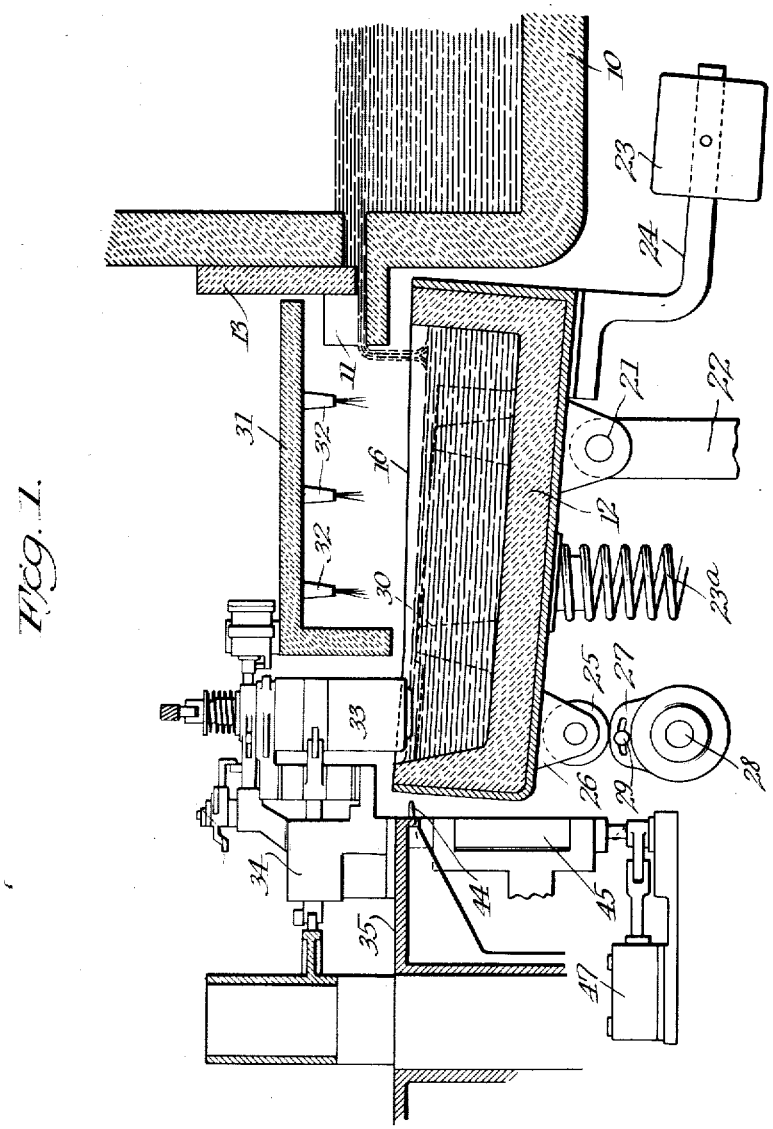

According to my invention the glass is supplied to the receiving pot or receptacle in any suitable manner, as by flowing from the melting tank or furnace in a regulated stream, and is circulated in the pot or receiving receptacle in separate supply and return passages leading to and from the forward exposed end of the pot from which the mold charges are withdrawn. The pot is preferably mounted for tilting or rocking movement, and is so arranged that in its normal position it is horizontal to permit the glass to flow to the forward or gathering end of the pot where it is removed therefrom. As the mold charges are gathered into the molds and the molds move away from the gathering position toward the side of the pot, the glass in the forward end of the pot is circulated in the direction of mold movement by reason of the tenacious thread of glass between each successive mold and the supply. This thread of glass is sheared automatically when the mold reaches a position over one side of the pot, and being chilled by contact with the shear, is thrown by the shear into the return passage leading away from the gathering chamber where it may be reheated and returned into the supply passage at the rear end of the pot. The flow of the glass in the return passage away from the gathering chamber may be advantageously accelerated by periodically lifting the forward end of the pot. I prefer to utilize this advantage in raising the level of the glass into contact with the successive molds to establish a charging contact with the molds, and hence dispense with the necessity of dipping heads for the molds on the shaping machine. The invention also provides for the prevention of retrograde movement of the glass in the return passage so as to insure the presence of fresh glass in the gathering chamber uncontaminated by portions of chilled glass which are harmful to the manufacture of high grade glassware.

In the illustrated embodiment of the invention, the molten glass, which may be melted in a melting tank or furnace 10 of usual design, is flowed over a spout 11 in a continuous stream and into a pot or receptacle 12 of convenient size from which the mold charges are withdrawn, the supply to the pot being controlled by a suitable gate 13 proportionately to the withdrawal of glass from the pot so as to maintain the level of glass in the pot substantially constant, as is well understood in the art. The pot may be of any desirable shape and construction suitable for the method above described, and as shown herein is advantageously of rectangular shape, being provided with a transversely elongated forward end 14 constituting a gathering chamber or area of considerable length.

The body of the pot is preferably divided longitudinally by means of a partition 16 providing separate supply passages 17 and 18 leading respectively to and from the gathering chamber for the supply of fresh glass thereto and the withdrawal of chilled glass therefrom. The passages 17 and 18 are connected by a cross passage 19 at the rear of the pot, preferably at the point where the stream of glass from the tank 10 enters the pot, so that the continuous supply of this hotter glass assists in reheating and bringing to the desired uniform temperature the chilled glass returning through the passage 18. Preferably the front portion of the partition 18 extends across the gathering chamber and forward edge of the pot, and is advantageously slightly lower at this point to provide a channel 20 to permit movement of the molds and facilitate flow of the glass across the gathering chamber during the gathering operation of the glass.

According to my invention the pot is advantageously mounted for rocking or tilting movement suitable to effect periodic raising and lowering of the forward or gathering end thereof, and to this end the pot is preferably pivotally mounted upon a pin or other hinge member 21 adjacent its rear end and which is fixed to a suitable support 22, the pot being substantially counterbalanced upon its pivotal support 21 by means of a counterbalance weight 23 adjustably secured on an arm 24 or a spring 23ª, as shown in Fig. 1 may suffice. Means are provided for periodically raising and lowering the forward end of the pot, which may be of any suitable construction. In the illustrated form I have provided a roller 25, secured to the underface of the pot 12 by means of a bracket 26, and adapted to ride upon the peripheral face of the cam 27 which may be secured to a rotatable shaft 28. The lobe portion of the cam 27 is preferably made in two parts, adjustably connected together by means of a bolt and slot 29, so that the effective length of the lobe and the corresponding duration of time that the pot is held raised may be varied according to the speed of movement of the molds and the length of time that the molds remain at the gathering position over the forward end of the pot, as will be understood.

The return passage 18 in the pot is preferably formed with a plurality of transversely extending partitions or dams 30, adapted to successively trap the chilled portions of glass returning through the passage 18 and to prevent the counter-flow of any part thereof back into the gathering chamber, as illustrated in Fig. 4. The forward dam may advantageously be of the same height as the front portion 20 of the middle partition, and the rear dam somewhat higher.

It will be apparent that as the forward end of the pot is raised, the flow of glass tending to assume its normal horizontal level will be to the rear of the pot, and the glass confined in the return passage 18 will flow gradually on successive lifting movements of the forward end over the successive partitions 30. As the chilled portions of the glass float upon the bath of hotter glass, these chilled portions will be progressively moved to the rear of the pot in the passage 18, toward the passage 19 where they commingle with fresh hot glass from the tank and flow into the supply passage 17. Preferably the major portion of the pot is covered by a hood member 31, exposing only the forward end of the gathering chamber, and advantageously a plurality of burners 32 will be mounted on this hood for reheating the chilled glass during its flow through the passage 18.

The glassware forming machine, carrying the gathering molds 33, may be of any construction and design suitable for the type of ware to be manufactured, as for instance, a continuously rotating machine having a dipping head carrying the gathering molds 33 as shown, for example, in the La France Patent No. 1,185,687, granted June 6, 1916, or it may be an intermittently rotated machine of the type described and claimed in my copending application Serial No. 408,890, filed November 21, 1929, having the gathering molds movable in a uniform horizontal path.

Preferably, however, I prefer to use a machine of the character shown in my copending application because of the simplicity of construction and control. Such a machine comprises generally a circular series of parison or gathering molds 33 carried by supports 34 on a mold carrier 35 arranged to move the molds horizontally and in succession to the gathering position over the gathering pot. The shaping machine may include more than one set of molds, which may be mounted upon one or more mold carriers as desired. In the case of a shaping machine carrying parison and finishing molds, suitable, for example, for the manufacture of hollow glass containers, the mold carriers may be geared together for movement in unison, and as shown in my copending application, may be rotated by a fluid pressure operated Geneva gear drive embodying, for example, as shown diagrammatically in Fig. 6, a fluid pressure operated actuator 36 having opposed racks 37 in engagement with a rotary gear 38 having driving engagement with the Geneva gear 39. As disclosed in my copending application the relative shifting movement between the rack members 37 and the rotary gear 38 may be effected by a fluid pressure operated piston 40 controlling an indexing valve 41 adapted to control the admission of fluid pressure regulated by a timing valve 42 to control the valve 43 for operating the fluid pressure actuator. The timing valve 42 is advantageously driven from the motor driven cam shaft 28 so that the tilting movement of the pot is controlled synchronously with the rotative movement of the gathering mold.

In using the invention with a machine of the type disclosed in my copending application above referred to, the shearing mechanism may comprise a shearing blade 44 on a rockable shaft 45 mounted between the blank mold carrier and the pot (see Figs. 1 and 2) at a proper elevation to wipe across the down face of the gathering molds, and shear the thread of glass therefrom.

The shearing blade may be actuated by any suitable means, as for example, a fluid pressure operated piston 46 working in an open ended cylinder 47. Advantageously the shear is actuated when the mold has moved over the forward end of the partition 20, at which time the pot may be sufficiently advanced in a downward movement to permit the shear to move across the upper edges of its walls. Hence the shearing immediately follows the initiating of the timing movement of the molds.

As disclosed in my copending application and in Fig. 6 of the drawings herein, a resetting valve 56 is provided adapted to permit the application of fluid pressure to certain pneumatically operated parts during stop periods of the mold movement, and to reset such parts as the molds start their next succeeding movement. This resetting air, through line 57, may be used to actuate the piston 46 to swing the shear blade 44 across the bottom face of the mold. The admission of air pressure from line 57 to the rear end of cylinder 47 is controlled by a suitable valve 58, preferably a piston valve, adapted to receive air from a suitable source, as for example, the timing valve 42, before the molds start their movement, to move it in proper position so that air from the resetting line 57 of the resetting valve 56 may actuate the shear as the mold reaches its position over the partition 20. After shearing, it is necessary to return the shear to its normal position to permit the next lifting of the pot, and this may be accomplished by by-passing the air from the line 57 to one end of the valve 56 through line 59 after the piston 46 has made its actuating stroke. Resetting of valve 56 permits line 57 to exhaust through the valve 56 and spring 58 surrounding the piston rod to return piston 46 to its normal position. Obviously other arrangements for actuating the shear motor may be used, as for example by controlling the shear motor 47 directly from the timing valve 42 through a port separate from the port that supplies air to the indexing valve 41 in which case the valve 58 may be dispensed with.

In action, the rotary timer 42 is operated to control the shifting of the valve 43 for starting the rotation of the mold slightly ahead of the time that carrier roller 25 rolls off the lobe of the cam 27, and the pot starts moving to its lowered position. As the mold moves to position over the forward end 20 of the partition 16, the thread of glass between the bottom of the mold and the glass in the pot is sheared by any suitable shearing device 44, and the sheared chilled bit is thrown into the forward end of the return passage 18. By this time the pot has been lowered sufficiently to permit movement of the previously charged mold away from the gathering position and the movement of the next successive mold into gathering position. By the time the next mold moves into gathering position over the near end of the gathering chamber 14, the cam shaft 28 has made one rotation and is ready again to raise the pot to the position shown in Fig. 1, thus establishing charging contact between the glass in the pot and the bottom of the parison mold 33 which is then in gathering position. Upon the lifting of the forward end of the pot, the sheared bits from the preceding charges which were deposited in the forward end of the passage 18 are moved rearwardly over the first partition or dam 30, where they are brought under the action of one or more of the burners 32 to reheat them. Upon each successive raising movement of the forward end of the pot, these sheared bits are moved progressively rearwardly in the passage 18 and into the passage 19 communicating with the supply passage 17, where they mix with the fresh supply of glass flowing from the tank 10.

As is well understood, glass is a thermoplastic substance and at its proper working temperature is sufficiently fluid to slowly assume its natural level but is sufficiently viscous so that the level may be raised with the forward end of the pot and maintained in such raised position for the very short interval of time necessary to establish charging contact with the mold. As soon as the forward end of the pot reaches its elevated position, the glass in the pot starts to move to assume its natural level, which is possible in the construction shown, because, as will be noted, the rear end of the pot is of greater depth than the forward gathering end, and the withdrawal of the charge by the suction in the mold tends to hold it up. Upon the succeeding lowering movement of the pot, the major body of the glass at the rear end will flow forwardly again seeking its natural level so that a natural continuous circulation of glass is set up between the supply passage and the return passage through the gathering chamber in the direction of mold movement, which circulation is accelerated by the tilting or rocking movements imparted to the pot.

Obviously, in using my invention on the machines of the intermittent type above described, it may be desirable to lengthen the raised period of pot movement proportionately to the time that the gathering mold is at rest in charging position, in which case the lobe portion of the cam 27 may be lengthened to properly suit the device. When the invention is used in conjunction with continuously moving molds as above described, it obviously is necessary to maintain the raised period of pot movement for only a short interval sufficient for the establishing of the charging contact, after which it is desirable to immediately lower the pot, in which case the lobe portion of the cam may be shortened to suit this condition.

Advantages of my invention reside in the simple and effective means for maintaining circulation of glass in the pot, and the absence of moving parts working in the glass. The novel manner of accelerating the circulation of glass in the pot by periodically raising and lowering the forward end thereof permits of the use of gathering molds movable only in a uniform horizontal plane, and also does away with the complicated construction heretofore required in mounting the molds upon a dipping head or frame. A much better glass article can thereby be produced.

As will be apparent, the invention is adaptable to many uses in conjunction with many different kinds of forming or gathering molds and is not to be restricted to the details of construction herein shown.

I claim:

1. The method of gathering charges of molten glass into molds which consists in circulating the glass through separate channels of a receptacle to move hotter portions of glass to the gathering region and to remove chilled portions therefrom, which consists in periodically tilting the receptacle to cause the hotter glass to flow toward the gathering region and the chilled glass to flow away therefrom.

2. The method of gathering charges of molten glass in molds which consists in circulating the molten glass in a receptacle past a gathering area, and in tilting the receptacle to assist the flow of hotter glass to said gathering area, and the flow of chilled glass away therefrom and in successively trapping portions of the chilled glass to prevent its return to the gathering area except through circulation of the hotter portions thereof.

3. The improvement in the method of gathering charges of molten glass in molds which consists in establishing a co-operative relation between an open bottomed parison mold and the forward end of a receptacle containing a supply of molten glass in a certain predetermined order, circulating the glass in said receptacle in separate supply and return passages leading respectively to and from said forward end, periodically raising the forward end of the receptacle to establish a charging contact between the glass and the bottom of the mold and to cause flow of glass in the return passage away from the forward end, and then lowering the forward end of the receptacle to permit movement of the mold away from the receptacle and cause flow of fresh glass through the supply passage to said forward end.

4. The improvement in the art of gathering charges of molten glass into molds which consists in successively moving a series of gathering molds in a certain predetermined order over an exposed portion of a receptacle containing a supply of molten glass, circulating the glass in said receptacle in separate supply and return passages leading respectively to and from the exposed end thereof, raising the exposed portion of the receptacle as a mold is moved thereover to establish cooperative charging contact between the bottom of the mold and the glass in said receptacle, and simultaneously accelerating the flow of glass in the return passage away from the exposed end, and thereafter lowering the exposed portion of the receptacle to its normal position to effect flow of a fresh supply of glass to the exposed end and permit movement of the charged mold away therefrom.

5. That improvement in the art of gathering charges of molten glass in molds as set forth in claim 4 characterized by successively trapping the chilled glass in the return passage upon successive raising movements of the exposed portion of the receptacle.

6. That improvement in the art of gathering charges of molten glass in molds as set forth in claim 4 characterized by reheating the chilled glass in the return passage and directing it into the supply passage.

7. That improvement in the art of gathering charges of molten glass in molds as set forth in claim 4 wherein the chilled glass is reheated in the return passage and directed into the supply passage characterized by assisting the reheating of the chilled glass by continuously flowing a fresh supply of molten glass into the receptacle in the region where the reheated chilled glass is directed into the supply passage.

8. Glass gathering apparatus comprising a receptacle containing a supply of molten glass, a partition dividing said receptacle into supply and return passages leading to and from an exposed gathering area of said receptacle, means for circulating the glass to and from said gathering area, and means for trapping the portions of glass returned from the gathering area and reheating same, and means for returning the reheated glass into the supply passage.

9. Glass gathering apparatus comprising a receptacle containing a supply of molten glass and having an exposed gathering portion providing access to said glass from above, partition means dividing said receptacle into supply and return passage for respectively supplying fresh glass to and withdrawing chilled glass from the exposed gathering portion, means for periodically raising and lowering the exposed end of said receptacle with relation to the opposite end thereof to accelerate the flow of glass in the supply passage to the gathering area and return of the chilled glass in the return passage away from the gathering area, and means for trapping the chilled glass in the return passage and preventing its return to the gathering area except by way of the supply passage.

10. Glass gathering apparatus comprising a receptacle containing a supply of molten glass and having an exposed gathering portion providing access to said glass from above, partition means dividing said receptacle into supply and return passages for respectively supplying fresh glass to and withdrawing chilled glass from the exposed gathering portion, means for periodically raising and lowering the exposed end of said receptacle with relation to the opposite end thereof to accelerate the flow of glass in the supply passage to the gathering area and return of the chilled glass in the return passage away from the gathering area, and a plurality of baffles extending transversely of the return passage for preventing counter-flow of the glass therein and over which the chilled glass may successively flow upon each successive raising of the gathering area.

11. In combination with a glassware forming machine, comprising a series of upright gathering molds movable successively in a predetermined order past a gathering position, means for moving said molds horizontally, a receptacle containing a supply of molten glass and provided with an exposed gathering area over which said molds are successively moved, means for circulating the glass in said receptacle to supply fresh glass to the gathering area and remove chilled glass therefrom, and means for periodically raising and lowering the exposed gathering area of said receptacle with relation to the opposite end thereof, and means for controlling the raising and lowering means for operation synchronously with said glassware forming machine.

12. In combination with a glass ware forming machine comprising a series of upright gathering molds movable successively in a predetermined order past a gathering position, means for moving said molds horizontally, a rockably mounted receptacle containing a supply of molten glass and provided with an exposed gathering area over which said molds are successively moved, means for circulating the glass in said receptacle to supply fresh glass to the gathering area and remove chilled glass therefrom, and means for periodically rocking said receptacle to raise and lower the exposed gathering area of said receptacle respectively into and out of charging contact with said molds, and means for controlling the raising and lowering means for operation synchronously with said glassware forming machine.

13. Apparatus for gathering charges of molten glass as set forth in claim 11 characterized by the raising and lowering means being adjustable to variably control the duration of elevation according to the length of time the mold is in gathering position.

14. Glass gathering apparatus comprising a receptacle containing a supply of molten glass, means for continuously flowing a fresh supply of glass into said receptacle adjacent one end thereof, means for mounting said receptacle for tilting movement to effect raising and lowering of the opposite gathering end thereof, means for circulating the glass in said receptacle in separate passages to and from the gathering end, and means for imparting tilting movement to said receptacle to periodically raise and lower said gathering end to permit the flow of a fresh supply of glass to the gathering end when lowered and to accelerate the return flow of chilled glass away from the gathering end upon successive raising thereof.

15. Apparatus for delivering molten glass to molds or the like of glassware forming machines which gather charges of molten glass by suction comprising a receptacle, means for supplying said receptacle with molten glass in regulated amounts, a partition member within said receptacle providing a circulating channel wholly within said receptacle and outside of said tank, and means for periodically tilting the receptacle about a horizontal axis for causing intermittent circulation of glass through said channel past a region from which the mold charges are withdrawn.

In testimony whereof, I have signed my name to this specification.

EDWARD G. BRIDGES.

CERTIFICATE OF CORRECTION.

Patent No. 1,867,440.   July 12, 1932.

EDWARD G. BRIDGES.

It is hereby certified that the above numbered patent was erroneously issued to "Lynch Glass Machine Company, a corporation of Indiana" whereas said patent should have been issued to Lynch Corporation, a corporation of Indiana, said corporation being assignee of the entire interest in said inventionas shown by the records of assignments in this office; and that the said Letters Patent should be read with this correction therein that the same may conform to the record of the case in the Patent Office.

Signed and sealed this 25th day of October, A. D. 1932.

(Seal)

M. J. Moore,
Acting Commissioner of Patents.

ing end to permit the flow of a fresh supply of glass to the gathering end when lowered and to accelerate the return flow of chilled glass away from the gathering end upon successive raising thereof.

15. Apparatus for delivering molten glass to molds or the like of glassware forming machines which gather charges of molten glass by suction comprising a receptacle, means for supplying said receptacle with molten glass in regulated amounts, a partition member within said receptacle providing a circulating channel wholly within said receptacle and outside of said tank, and means for periodically tilting the receptacle about a horizontal axis for causing intermittent circulation of glass through said channel past a region from which the mold charges are withdrawn.

In testimony whereof, I have signed my name to this specification.

EDWARD G. BRIDGES.

CERTIFICATE OF CORRECTION.

Patent No. 1,867,440.                                     July 12, 1932.

EDWARD G. BRIDGES.

It is hereby certified that the above numbered patent was erroneously issued to "Lynch Glass Machine Company, a corporation of Indiana" whereas said patent should have been issued to Lynch Corporation, a corporation of Indiana, said corporation being assignee of the entire interest in said inventionas shown by the records of assignments in this office; and that the said Letters Patent should be read with this correction therein that the same may conform to the record of the case in the Patent Office.

Signed and sealed this 25th day of October, A. D. 1932.

(Seal)

M. J. Moore,
Acting Commissioner of Patents.

CERTIFICATE OF CORRECTION.

Patent No. 1,867,440.  July 12, 1932.

EDWARD G. BRIDGES.

It is hereby certified that the above numbered patent was erroneously issued to "Lynch Glass Machine Company, a corporation of Indiana" whereas said patent should have been issued to Lynch Corporation, a corporation of Indiana, said corporation being assignee of the entire interest in said inventionas shown by the records of assignments in this office; and that the said Letters Patent should be read with this correction therein that the same may conform to the record of the case in the Patent Office.

Signed and sealed this 25th day of October, A. D. 1932.

(Seal)

M. J. Moore,
Acting Commissioner of Patents.